June 20, 1967 S. A. YEFSKY 3,326,484

TAPE CARTRIDGE

Filed May 19, 1964 3 Sheets-Sheet 1

Inventor:
Sheldon Arthur Yefsky
By Hume, Groen, Clement & Hume Attys

Inventor:
Sheldon Arthur Yefsky
By Hume, Groen, Clement & Hume Attys

INVENTOR.
SHELDON ARTHUR YEFSKY
BY

ATTORNEYS.

United States Patent Office 3,326,484
Patented June 20, 1967

3,326,484
TAPE CARTRIDGE

Sheldon Arthur Yefsky, Skokie, Ill., assignor to Cook Electric Company, Morton Grove, Ill., a corporation of Delaware Filed May 19, 1964, Ser. No. 370,149
4 Claims. (Cl. 242—55.19)

This invention relates to a new and improved cartridge for holding magnetic recording tape or the like.

The present application is a continuation-in-part of application Ser. No. 231,972, filed Oct. 22, 1962, now abandoned, and is assigned to the same assignee as application Ser. No. 231,972.

One object of the present invention is to provide a new and improved tape cartridge of the type adapted to hold a coil or pack of tape in such a manner that tape may be simultaneously pulled from one end of the coil and returned to the opposite end of the coil, so that the cartridge serves as both a supply and a take-up device for the tape.

A further object of the invention is to provide a new and improved tape cartridge which may be operated for any desired length of time with an endless loop of tape by simultaneously withdrawing the tape from one point on the cartridge and returning it to another point, without any difficulty with snarling of the tape or jamming of the cartridge.

Another object of the invention is to provide a new and improved tape cartridge which is insensitive to its position of operation, in that the cartridge will operate satisfactorily for an indefinitely long period in any position or orientation.

Thus, it is an object of the present invention to provide a new and improved tape cartridge which does not rely upon gravity for its operation and which is insensitive to gravitational forces or forces due to acceleration of the cartridge.

Further objects and advantages of the present invention will appear from the following description, taken with the accompanying drawings, in which.

As generally outlined above, the present invention is directed toward an improved form of tape cartridge. Preferably, the cartridge is formed with a casing that defines a chamber for receiving an endless coiled tape pack and is suitably apertured to accommodate the passage of a loop of the tape that extends between the inner and outer convolutions thereof. The tape pack is preferably disposed about the hub and supported on the flat end wall of a tape reel which is joined to the casing by suitable fastening means. Preferably, the reel is formed so that the surface of the flat end wall thereof and the surface of the hub about which the tape pack is disposed are provided with coacting tapered surfaces that facilitate the free and unrestricted advance of the tape from the reel through the outlet opening provided in the cartridge casing. In addition, means, which are employed to join the reel to the cartridge casing, preferably include and/or coact with adjustable friction means for establishing adjustable frictional pressure on the sides of the tape pack engaged by the planar surfaces formed on the cartridge casing and on the reel.

Figure 1:
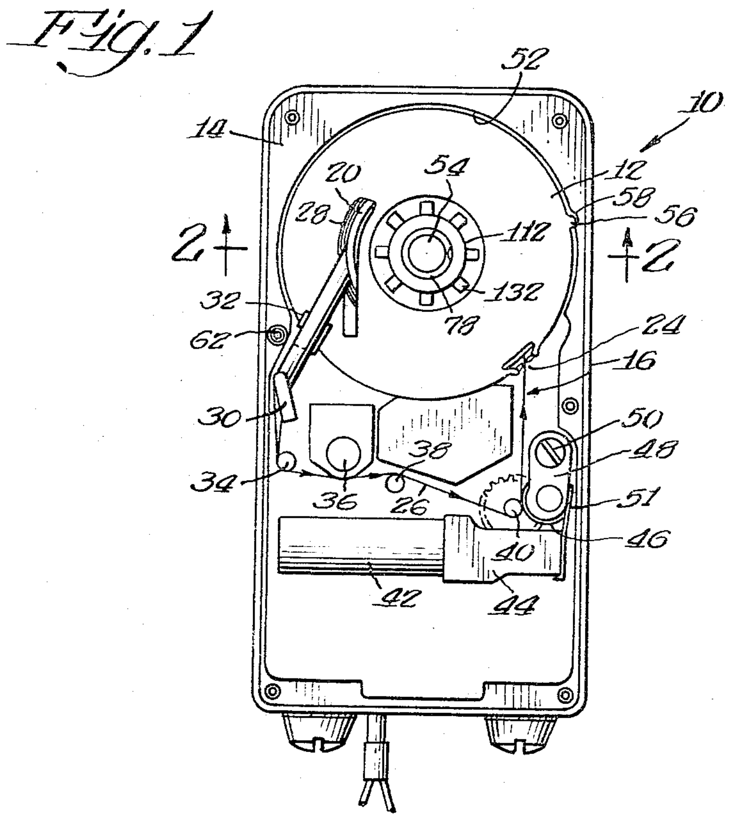
FIG. 1 is a plan view of a miniature tape recorder employing a tape cartridge to be described as an illustrative embodiment of the present invention.

It will be seen that FIG. 1 illustrates a magnetic tape recorder 10 which is of miniature size and thus is especially well adapted for use in aircraft, missiles, space vehicles, or the like. The tape recorder 10 employs a removable tape cartridge 12 which is mounted on a chassis or deck. As shown to advantage in FIGS. 2 and 3, the cartridge 12 holds magnetic recording tape 16 comprising a coil or pack 18 contained within the cartridge. The ends of the tape 16 may be spliced together to form an endless loop which may be utilized repeatedly by the tape recorder. Thus, the tape is pulled out of the cartridge 12 from the inner end of the pack 18 through an exit slot or opening 20 in the casing 22 of the cartridge. Simultaneously, the tape is returned to the cartridge through an entrance slot or opening 24 in the casing 22. It will be seen that outside the casing 12 the tape 16 is formed into a loop 26 which extends between the exit and entrance openings 20 and 24.

In passing through the exit slot 20, the tape 16 is twisted through 90° so as to slide flatwise over a smoothly rounded edge or corner 28 on one side of the exit slot 20. To return the tape to a position parallel to the axis of the coil 28, the tape is passed around a guide 30 in the form of an angularly oriented bar or pin. A smoothly polished and rounded ramp 32 is provided on the top of the casing 22 to support the tape between the exit slot 20 and the angle bar 30. From the angle bar 30, the tape passes around a roller or other guide 34 to a combination recording and playback head 36, and then over another guide roller 38. Next, the tape passes around a drive capstan 40 and then proceeds directly to the entrance slot 24 in the casing 22. The capstan 40 may be rotated, either continuously or intermittently, by a motor 42 coupled to the capstan by a suitable gear box 44. It will be seen that the tape is pressed against the capstan 40 by an idler roller 46 which is rotatably mounted on a carriage 48 swingable about a pivot 50. A spring 51 is employed to bias the carriage 48 in such a direction that idler roller 46 will firmly press the tape against the capstan 40.

In this case, the tape cartridge 12 is mounted in a well or opening 52 formed in the chasis 14. Optionally, a center pin 54 may also be provided on the chassis 14 to locate the cartridge. It will be seen that the casing 22 of the cartridge is formed with a key or ridge 56 which is received in a keyway or groove 58 formed in the chassis 14 at one point around the well 52. The engagement of the key and keyway prevents the cartridge casing 22 from rotating relative to the chassis 14. In addition, the casing 22 may be formed with a lug or abutment 60 which is engaged with a locating pin 62 on the chassis 14. Thus, the cartridge 12 is effectively located and prevented from moving or rotating on the chassis 14.

Figure 2:
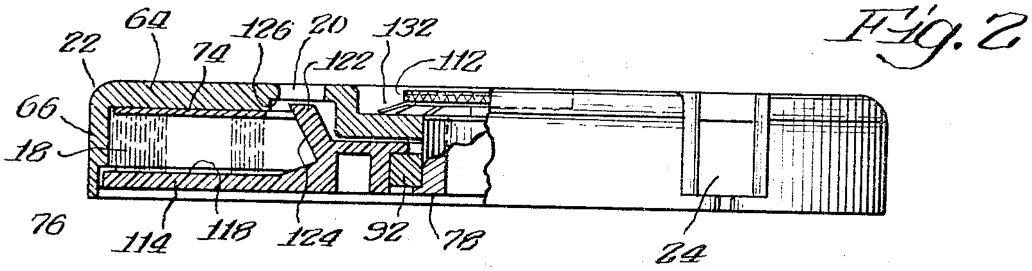
FIG. 2 is an enlarged view of one embodiment of the tape cartridge, partly in elevation and partly in section along a line 2—2 in FIG. 1.
Figures 3, 4, 5, 6:
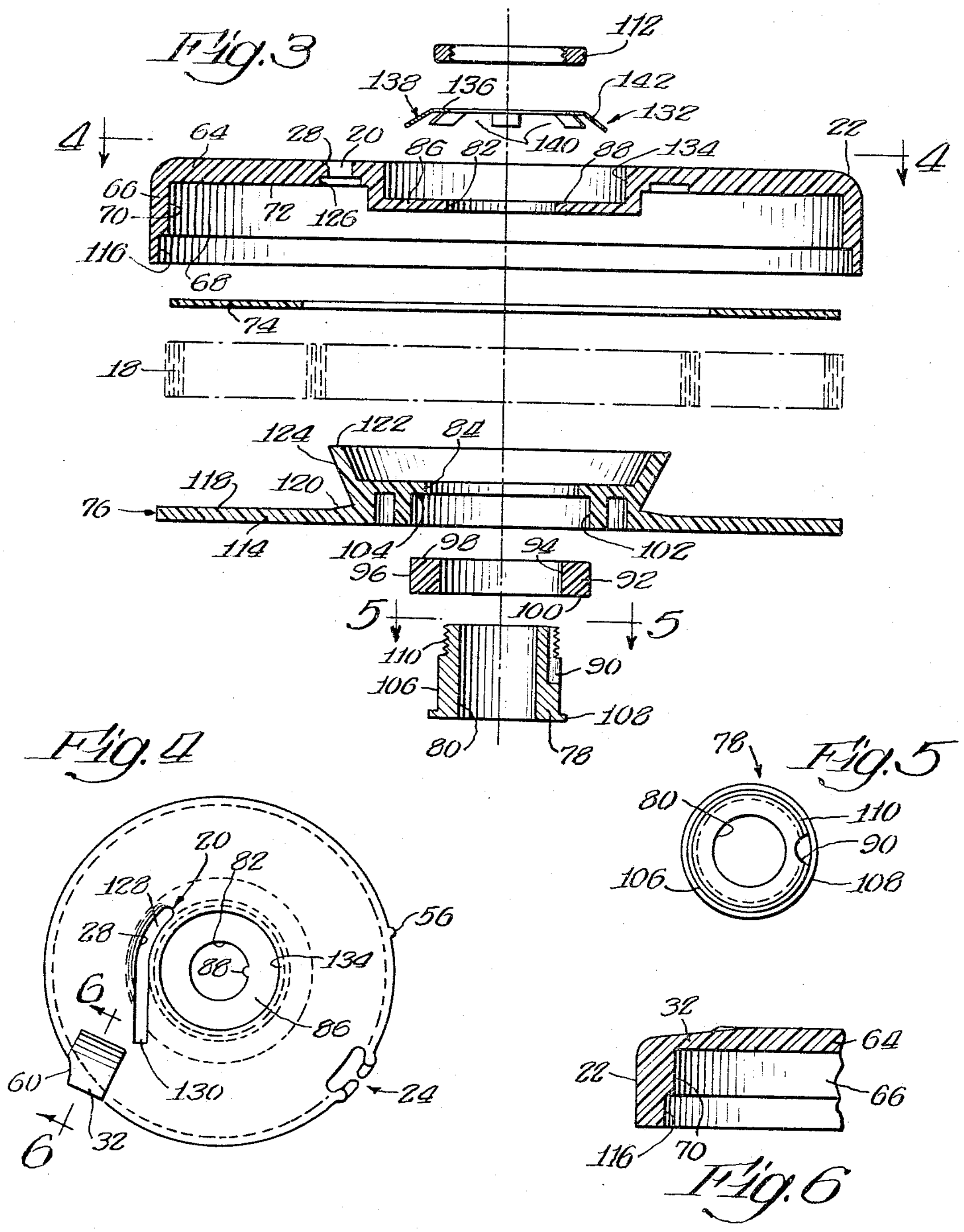
FIG. 3 is an exploded sectional view of the tape cartridge showing its various components in disassembled relation.
FIG. 4 is a plan view of the casing of the cartridge, taken as indicated by the line 4—4 in FIG. 3.
FIG. 5 is a plan view of the central bushing or shaft for the cartridge, taken generally as indicated by the line 5—5 in FIG. 3.
FIG. 6 is a fragmentary section through the casing of the cartridge taken generally along a line 6—6 in FIG. 4.

From FIGS. 2 and 3, it will be apparent that the cartridge casing 22 comprises a disc-like end wall 64 which is formed with a peripheral flange or wall 66 of generally cylindrical shape. Within the casing 22 is a generally cylindrical chamber 68 adapted to receive the tape coil or pack 18. The peripheral flange 66 has a cylindrical inner surface 70 which extends around the outside of the pack 18. The casing 22 may be made of any suitable material such as various plastics or metal.

The end wall 64 has a flat inner annular surface 72 which extends perpendicularly to the axis of the tape cartridge. The surface 72 is opposite one side of the tape pack 18 and might very well engage the pack. However, in this case, the surface 72 is provided with a flat annular disc-like facing or bearing 74 for engaging the side of the tape pack. As will appear in greater detail shortly, the facing 74 controls the movement of the tape pack within the casing by frictional engagement with the tape pack. The facing disc 74 may be made of a polyethylene terephthalate resin sold under the trademark Mylar, various other plastics, or other suitable materials. The use of a polyethylene terephthalate resin sold under the trademark Mylar provides a reduced coefficient of friction between the tape pack and the casing.

The tape pack 18 is supported on a reel or spool 76 which is rotatably mounted in the casing. To support the reel, a center post or shaft 78 extends through the reel and the casing 22. The shaft 78 is in the form of a hollow bushing having an axial bore 80 therein to receive the central locating pin 54. To receive the shaft 78, openings 82 and 84 may be formed in the casing 22 and the reel 76. The opening 84 is substantially larger than the shaft 78 to provide clearance between the reel and the shaft. However, the shaft 78 is closely received in the opening or bore 82 which is formed in an inwardly offset central portion 86 of the end wall 64 on the casing 22. A key and keyway connection may be provided between the casing 22 and the central shaft 78 to retain the shaft against rotation relative to the casing. In this case, a key 88 is formed on the casing 22 and is adapted to be received in a keyway or slot 90 formed in the shaft 78. The key 88 projects from the wall 86 into the central opening 82.

To minimize friction, a bearing 92 may be interposed between the reel 76 and the shaft 78. As shown, the bearing 92 is in the form of a ring made of anti-friction material such as polytetrafluoroethylene. The bearing ring 92 has inner and outer cylindrical surfaces 94 and 96 and opposite end faces 98 and 100.

A recess or counter bore 102 may be formed in the reel 76 to receive the bearing ring 92. A flange 104 between the opening 84 and the counter bore 102 is adapted to engage the end face 98 of the bearing ring 92.

It will be seen that the shaft 78 is formed with an external cylindrical surface 106 which is received within the cylindrical bore 94 in the bearing 92. A flange or head 108 is formed on one end of the shaft 78 to engage the end face 100 on the bearing 92 and to transmit end thrust to the bearing. At its opposite end, the shaft 78 may be formed with a reduced, threaded portion 110 adapted to receive an internally threaded nut 112 which retains the shaft 78 in the cartridge.

The illustrated reel 76 has a flat disc-like end wall or flange 114 which closes the cylindrical chamber 68 in the casing 22. It will be seen that an enlarged counter bore 116 is formed in the peripheral flange 66 of the casing 22 to receive the end wall 114 of the reel 76. The end wall 114 has a flat annular inner surface 118 for engaging one side of the tape pack 18, opposite from the side engaged by the facing disc 74 on the casing 22.

An inclined generally frustoconical surface 120 extends inwardly from the flat surface 118, shown to advantage in FIG. 3. This inclined surface 120 provides an annular ramp which directs the inner portion of the tape pack 18 toward the exit opening or slot 20 in the end wall 64 of the casing 22.

The reel 76 has a hub portion or flange 122 comprising frustoconical outer surface 124 which flares at a fairly pronounced angle away from the end wall 114 so as to guide the inner end of the tape pack 18 toward the exit slot 20. The smaller end of the flaring surface 124 connects with the smaller end of the frustoconical surface 120. It will be observed that the surfaces 120 and 124 taper in opposite directions.

As will be seen from FIG. 2, the hub or flange 122 on the reel 76 projects into an annular groove or recess 126 formed in the flat inner face 72 of the end wall 64 on the casing 22. The exit slot 20 connects with the groove 126. It will be seen that the exit slot 20 has an arcuate portion 128, and also a straight portion 130 which connects tangentially with one end of the arcuate portion 128. Means are provided to urge the reel 76 into the casing 22 so that end walls 64 and 114 will provide frictional pressure against the opposite sides of the tape pack 18. In this case, the biasing action is provided by a resilient member in the form of a spring washer 132 interposed between the nut 112 and central wall portion 86 of the casing 22. The nut 112 and the spring 132 are received within a recess or counter bore 134 formed in the end wall 64 of the casing 22 opposite the central wall portion 86.

The illustrated spring washer 132 has a flat central disc-like portion 136 which is provided with a generally frustoconical skirt 138. A plurality of slots 140 are formed in the skirt 138 to provide spring fingers 142 between the slots. It will be understood that the fingers 142 are adapted to flex when the nut 112 is tightened down on the threaded portion 110 of the shaft 78.

In the operation of the cartridge 12, the inner end of the tape pack is pulled out of the casing 22 through the exit slot 20 by the driving action of the capstan 40. The pull on the tape causes the reel 76 to rotate within the casing 22, which remains stationary. The rotation of the reel 76 pulls the tape into the casing 22 through the entrance slot 24 which is formed in the peripheral flange 66 of the casing. It will be noted that the tape is pulled from the inside of the pack 18 but is reeled or wound on to the outside of the pack. Because of the greater diameter of the outside of the pack, the tape tends to be wound on to the pack faster than it is pulled out of the center of the pack. By virtue of this tendency, tension is developed in the tape between capstan 40 and the tape cartridge, sufficient to insure the rewinding of the tape onto the tape pack in the cartridge.

The difference between the outer and inner diameters of the tape pack is compensated for by slippage of the tape along the pack and slippage of the entire pack relative to the reels 76. This slippage is an essential factor in the continued operation of the tape cartridge. The slippage is controlled and regulated by the frictional engagement of the casing and the reel against the opposite sides of the tape pack. Such frictional engagement makes it possible for the tape cartridge to remain in stable operation for any desired length of time, without any difficulty with jamming of the cartridge or snarling of the tape. Inasmuch as the frictional engagement is maintained by spring action, the operation of the tape cartridge is insensitive to gravity or forces of acceleration. Thus, the tape cartridge will operate satisfactorily in any position or orientation. This is an important advantage when the tape cartridge is employed in aircraft, missiles, space vehicles, or the like which are subject to changes in orientation, acceleration, and gravity. The nut 112 may be adjusted along the threaded portion 110 of the shaft 78 to regulate the force of the spring 132. In this way, the frictional drag on the tape pack may be varied.

The continuous tension in the tape pack results in a constant inwardly directed radial force, normal or perpendicular to the tape. Such normal force is transmitted through the many convolutions of the tape in the pack to the innermost convolution which is thus pressed against the frustoconical outer surface 124 of the hub 122. The magnetic tape may have a lubricated or slippery outer surface and an inner surface which is coated with a magnetic oxide material which is less slippery. The lubricated surface of the tape facilitates the continuous slippage which occurs in the pack. The normal or perpendicular force due to the tension in the tape is transmitted with low loss through the many convolutions which continuously slip. In the innermost convolution, which has its high friction oxide surface against the outer surface 124 of the hub, the normal or perpendicular force is transmitted as the driving force to the spool or reel 76. Thus, the driving force is proportional to the normal or perpendicular force, the coefficient of friction between the tape and the surface 124, and the angle through which the innermost convolution is wrapped around the surface 124 of the hub.

Another important feature of the tape cartridge resides in the provision of the tapered frustoconical surfaces 120 and 124 on the reel. It has been found that these frustoconical surfaces guide and direct the tape from the inner portion of the tape pack to the exit slot 20 in a smooth and efficient manner so as to avoid any difficulties in the movement of the tape in this zone.

Figure 7:
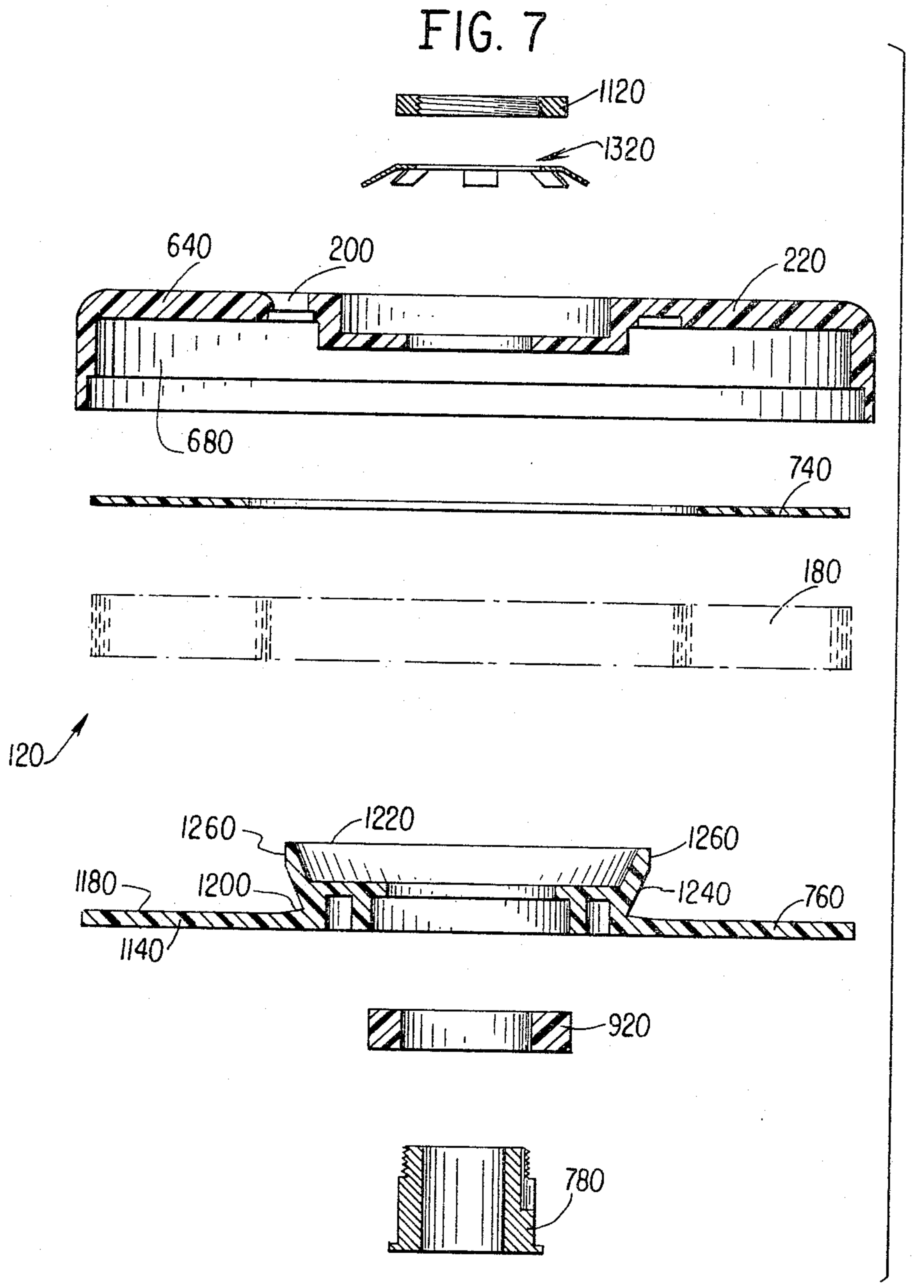
FIG. 7 is an exploded sectional view of another embodiment of the tape cartridge.

Considering now the second embodiment of the present invention, attention is invited to FIG. 7. The second embodiment is identified generally by reference numeral 120 and includes the identical components as the cartridge 12, with the exception of the reel. More specifically, the cartridge 120 includes a casing 220, a lubricated facing disc 740 adapted to be suitably secured to the casing 220, a tape pack 180, one side of which is adapted to engage the facing disc 740, a reel 760 adapted to engage the other side of the tape pack 180, a shaft 780, associated bearing 920, spring washer 1320, and locking nut 1120. The above-described components function in substantially the same manner as the corresponding components in the tape cartridge 12.

Referring now in greater detail to the reel 760, it has a flat disc-like end wall or flange 1140 which closes the cylindrical chamber 680 defined by the casing 220 when the reel 760 and casing 220 are assembled. The end wall or flange 1140 has a flat annular inner surface 1180 that engages the lower side (as seen in FIG. 7) of the tape pack 180. The innermost part of the flat surface 1180 terminates in an upwardly and inwardly inclined, generally frusto-conical surface 1200. This inclined surface 1200 provides an annular ramp which directs the innermost convolutions of the tape pack 180 toward the exit opening or slot 200 in the end wall 640 of the casing 220. Reel 760 has a hub 1220 comprising an inverted frustoconical surface 1240 which flares at a fairly pronounced angle away from the end wall 1140 so as to guide the innermost convolution of the tape pack 180 toward the exit slot 200. As illustrated, the lower end of the surface 1240 intercepts the innermost end of the frustoconical surface 1200, the taper of these surfaces 1200 and 1240 being in opposite directions.

The hub 1220 of the reel 760 differs from the hub 122 of the reel 76 in that the conical surface 1240 does not terminate on the upper surface of the hub 1220, as does the conical surface 124 in the hub 122. Specifically, the hub 1220 is vertically beveled at its upper end to define a support surface 1260 that is substantially right-angularly related to the flat surface 1180. In a preferred embodiment, the height of the support surface 1260 is .050″ in contrast to the width of the upper end of the hub which is 1.350″. These dimensions compare with a length of 1.40″ for the upper end of the hub 122 of the cartridge 12. It will be appreciated that the cartridge 12 can be changed into the cartridge 120 by the simple expedient of beveling the sharp corner at the upper end of the hub 122 of the cartridge 12.

It will be appreciated that as the tape is removed from the cartridges 12 or 122, it must move radially as well as vertically. By the use of the hub 122 in the cartridge 12, there is a slight tendency for the tape to be constrained by the sharp corner on the upper end of the hub 122, thereby tending to restrain completely free vertical movement of the tape from the pack 18 toward the exit slot 20. On the other hand, by the use of the beveled hub 1220, the beveled surface 1260 eliminates any sharp corner that might inhibit the vertical movement of the tape and maintains the tape in a generally circular, perpendicular attitude for easy withdrawal from the cartridge 120. Hence, tapes having a broad range of characteristics or tapes having a broad range of tensions may be used with the cartridge 120. One of the more specific advantages of the beveled hub 1220 is that the tape at substantially higher tension can be used in the cartridge 120, thereby assuring better attitude insensitivity of the cartridge.

Considering now the surface 1260 in greater detail, it will be appreciated that the innermost convolution moves both radially and vertically from the tape pack to pass through the exit slot 200 in the casing 220. As the inclined surface 1240 guides the innermost convolution onto the beveled surface, the beveled surface 1260 offers support for the convolution, particularly during its vertical movement. Inasmuch as the hub 1220 does not present a sharp corner (i.e., line friction contact of extreme force) to the tape, the vertical movement of the innermost convolution is facilitated with the result that possible jamming of the cartridge 120 is further reduced. (It should be understood that if the tape were restrained vertically, it would continue to move radially and would fail to move vertically through the exit slot 200, thereby jamming the tape betwen the casing 220 and the pack 180.) Although the cartridge 12 operates satisfactorily with a particular range of tapes under a range of operating conditions, the cartridge 120 operates with a wider range of tapes under a wide range of operating conditions.

By virtue of the tape cartridge of the present invention, the endless length of tape may be fed repeatedly through the tape recorder over an extremely long period of time without any difficulty with the tape cartridge. Various signals may be recorded on the tape, played back and subsequently erased so that the tape may be used over and over again. Thus, the tape recorded may be advantageously used for recording instrumentation signals over a period of time for later playback and transmission.

Various modifications, alternative constructions and equivalents may be employed without departing from the true spirit and scope of the invention, as exemplified in the foregoing description and defined in the following claims.

I claim:

1. In a tape cartridge, the combination comprising a substantially rigid casing, a pack of tape coiled in said casing, a first end wall on said casing and engaging one side of said pack, inlet and outlet means in said casing for accommodating a loop of tape extending between the inner and outer convolutions of the tape pack, a reel rotatably mounted in said casing and supporting said pack, said reel having a hub portion within said pack and a second end wall engaging the opposite side of said pack, a central shaft extending axially through said reel and said casing, said reel and said casing having openings for receiving said shaft, said shaft having a threaded end portion extending beyond said casing, fastener means coacting with said threaded end portion, and spring means interposed between said fastener means and said casing for applying frictional pressure between each of said end walls and the corresponding side of said pack, said fastener means being adjustable to regulate said pressure.

2. In a tape cartridge, the combination comprising a substantially rigid casing, a pack of tape coiled in said casing, said casing having a flat end wall that defines a first planar surface for engaging one side of said tape pack, said casing defining inlet and outlet openings for accommodating the passage of a loop of tape extending between the inner and outer convolutions of the tape pack, a reel for supporting said tape pack, said reel being rotatably mounted in said casing, said reel having a hub portion about which said tape pack in disposed, said reel having an end wall that defines a second planar surface for engaging the other side of said tape pack, said hub portion on said reel having a generally frustoconical outer surface flaring away from said reel end wall and toward said casing outlet opening so as to guide the inner end of said tape loop through said outlet opening, said hub portion having an outermost section merging with said frustoconical surface, said outermost section of said hub being formed with a surface that extends substantially perpendicular to the planar surface defined by said reel end wall so as to support a portion of said tape loop as it is withdrawn from said pack through said outlet opening, a central shaft extending axially through said reel and said casing, said reel and said casing having aligned openings for receiving said shaft, said shaft having a threaded end portion extending beyond said casing, fastener means coacting with said threaded end portion of said shaft so as to join said casing and said reel, and resilient biasing means interposed between said fastener means and said casing for applying frictional pressure between said end walls and the sides of said tape pack, said fastener means being adjustable to accommodate the regulation of said frictional pressure.

3. In a tape cartridge, the combination comprising a substantially rigid casing, an endless tape pack coiled in said casing with a loop of tape extending therefrom, said casing having a flat end wall that defines a first planar surface for engaging one side of said pack, said casing being formed with inlet and outlet openings for accommodating the passage of a loop of tape extending between the inner and outer convolutions of the tape pack, a reel for supporting said tape pack, said reel being rotatably mounted in said casing, said reel having a hub portion about which said tape pack is disposed, said reel having a generally disc like end wall portion that defines a second planar surface lying parallel to the first planar surface defined by said casing end wall, said casing and said reel hub being formed with aligned coaxial apertures, said reel hub having a generally frustoconical outer surface extending away from said second planar surface, said disc like end wall being formed with a ramp like portion that merges and coacts with said frustoconical hub surface so as to guide a portion of said tape loop toward said outlet opening, means extending through said apertured portions of said casing and said reel hub for effecting the joining thereof so as to bring said first and second planar surfaces defined by said casing and said reel into engagement with the sides of said tape pack, and adjustable means joined to and coacting with said last mentioned means for establishing adjustable frictional pressure between said planar surfaces and said tape pack.

4. In a tape cartridge the combination comprising a casing that defines a generally cylindrical chamber, an endless tape pack coiled in said chamber with a loop of tape extending therefrom and between the inner and outer convolutions of said pack, said casing having disc like end wall that defines a first planar surface for engaging all of the convolutions on one side of said tape pack, a reel rotatably mounted within said chamber, said reel having a generally disc like end wall portion that defines a second planar surface lying parallel to the first planar surface defined by said casing end wall, said second planar surface engaging all of the convolutions on the other side of said tape pack except for the innermost convolutions thereof, said casing being formed with an inlet opening and an outlet opening for accommodating the passage of said tape loop between the innermost and outermost convolutions of said tape pack, said reel being further formed with a hub about which said coiled tape pack is concentrically disposed, said reel hub being formed with an inverted generally frustoconical outer surface that extends in a direction away from said second planar surface and toward said outlet opening to guide a portion of said tape loop to and through said outlet opening, said reel end wall being further formed with a portion that defines a generally frustoconical ramp surface that extends between said second planar surface and said hub surface, said ramp surface functioning to direct a portion of said tape loop from the innermost convolution of said tape pack against said hub surface and toward said outlet opening, said casing and said reel hub being formed with aligned coaxial apertures, means extending through said apertured portions of said casing and said reel hub for effecting the joining thereof so as to bring said first and second planar surfaces defined by said casing and said reel into engagement with the sides of said tape pack, and adjustable means joined to and coacting with said last mentioned means for establishing adjustable frictional pressure between said planar surfaces and said tape pack.

References Cited

UNITED STATES PATENTS

| | | | |
|---|---|---|---|
| 1,075,487 | 10/1913 | Merkel | 242—55.18 |
| 1,254,272 | 1/1918 | Ponon | 242—55.19 |
| 1,873,063 | 8/1932 | Somers | 242—68.3 |
| 2,001,780 | 5/1935 | Fry | 242—75.45 |
| 2,066,405 | 1/1937 | Knowlton | 242—75.4 |
| 2,490,771 | 12/1949 | Begun | 352—128 X |
| 2,951,654 | 9/1960 | Steelman | 242—55.13 |
| 2,964,256 | 12/1960 | Gorey | 242—55.19 |
| 2,965,331 | 12/1960 | Nagy | 242—138 |
| 3,025,012 | 3/1962 | Fries | 242—55.19 |
| 3,030,041 | 4/1962 | Cousino | 242—55.19 |
| 3,161,362 | 12/1964 | Smith | 242—55.19 |

FRANK J. COHEN, *Primary Examiner.*

MERVIN STEIN, B. S. TAYLOR, *Assistant Examiners.*